US008577809B2

(12) United States Patent
Hawkes et al.

(10) Patent No.: US 8,577,809 B2
(45) Date of Patent: Nov. 5, 2013

(54) METHOD AND APPARATUS FOR DETERMINING AND UTILIZING VALUE OF DIGITAL ASSETS

(75) Inventors: Philip Hawkes, Warrimoo (AU); Alexander Gantman, Poway, CA (US); Cameron A. McDonald, Queenscliff (AU); Miriam M. Wiggers De Vries, Crows Nest (AU); Craig W. Northway, Aspley (AU); Craig M. Brown, Harbord (AU)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 13/174,545

(22) Filed: Jun. 30, 2011

(65) Prior Publication Data

US 2013/0006868 A1    Jan. 3, 2013

(51) Int. Cl.
*G06F 21/00* (2013.01)

(52) U.S. Cl.
USPC .................. 705/59; 705/54; 705/57; 705/58; 705/902

(58) Field of Classification Search
USPC ........................................ 705/54, 57–59, 902
See application file for complete search history.

(56) References Cited

U.S. PATENT DOCUMENTS

| 5,671,412 | A * | 9/1997 | Christiano | 1/1 |
| 6,029,145 | A * | 2/2000 | Barritz et al. | 705/34 |
| 6,169,976 | B1 * | 1/2001 | Colosso | 705/59 |
| 6,427,140 | B1 * | 7/2002 | Ginter et al. | 705/80 |
| 7,124,101 | B1 * | 10/2006 | Mikurak | 705/35 |
| 7,599,927 | B2 * | 10/2009 | Lebrat | 1/1 |
| 7,680,993 | B2 | 3/2010 | Dougall | |
| 2002/0120501 | A1 * | 8/2002 | Bell et al. | 705/14 |
| 2003/0040942 | A1 | 2/2003 | Hooten | |
| 2004/0220837 | A1 | 11/2004 | Bonissone et al. | |
| 2004/0249768 | A1 * | 12/2004 | Kontio et al. | 705/65 |
| 2005/0010767 | A1 * | 1/2005 | Craft | 713/168 |
| 2006/0026044 | A1 | 2/2006 | Smith | |
| 2007/0005389 | A1 | 1/2007 | Apparao et al. | |
| 2007/0061247 | A1 | 3/2007 | Ramer et al. | |

(Continued)

FOREIGN PATENT DOCUMENTS

JP    2010026866 A    2/2010
WO   WO2004/077793 A1 *  9/2004

OTHER PUBLICATIONS

Liu, et al., "Mitigating Inadvertent Insider Threats with Incentives," Financial Cryptography and Data Security (FC2009), Roger Dingledine, Philippe Golle (Eds.), Lecture Notes in Computer Science, vol. 5628, pp. 1-16, 2009.

(Continued)

*Primary Examiner* — Calvin Cheung
(74) *Attorney, Agent, or Firm* — Won Tae Kim

(57) ABSTRACT

Systems and methods for protecting digital assets associated with a computing device are described herein. An example of a method according to the disclosure includes assigning at least one asset worth value to respective digital assets associated with a device, computing at least one device worth value using the at least one asset worth value assigned to the digital assets associated with the device, identifying at least one device worth value threshold, performing a comparison of the at least one device worth value to the at least one worth value threshold, and initiating at least one action with respect to the digital assets associated with the device based on the comparison.

66 Claims, 4 Drawing Sheets

(56) References Cited

U.S. PATENT DOCUMENTS

| | | | |
|---|---|---|---|
| 2007/0198363 A1* | 8/2007 | Quoc et al. | 705/26 |
| 2008/0033736 A1* | 2/2008 | Bulman | 705/1 |
| 2008/0091613 A1* | 4/2008 | Gates et al. | 705/59 |
| 2008/0208668 A1 | 8/2008 | Heller et al. | |
| 2008/0281675 A1* | 11/2008 | Zhang | 705/10 |
| 2009/0006542 A1* | 1/2009 | Feldman et al. | 709/203 |
| 2009/0019149 A1* | 1/2009 | Cohen et al. | 709/224 |
| 2009/0031428 A1* | 1/2009 | Brew et al. | 726/27 |
| 2009/0150236 A1* | 6/2009 | Price | 705/14 |
| 2009/0157843 A1 | 6/2009 | Apparao et al. | |
| 2009/0177301 A1* | 7/2009 | Hayes | 700/94 |
| 2010/0094728 A1* | 4/2010 | Denning et al. | 705/27 |
| 2010/0153282 A1* | 6/2010 | Graham | 705/310 |
| 2010/0211217 A1* | 8/2010 | Hirsh et al. | 700/234 |
| 2010/0306193 A1* | 12/2010 | Pereira et al. | 707/728 |
| 2011/0191332 A1* | 8/2011 | Barve et al. | 707/723 |
| 2011/0208616 A1* | 8/2011 | Gorman et al. | 705/27.1 |
| 2012/0084804 A1* | 4/2012 | Simmons | 725/28 |

OTHER PUBLICATIONS

Callagher: "Managing Risk in the Digital Age," Arthur Gallagher International, May 2001 [retrieved on Dec. 13, 2012]. http://www.ajginternational.com/assets/Uploads/Publications/Managing-Risk-in-the-Digital-Age2.pdf.

International Search Report and Written Opinion—PCT/US2012/045051—ISA/EPO—Jan. 22, 2013.

\* cited by examiner

METHOD AND APPARATUS FOR DETERMINING AND UTILIZING VALUE OF DIGITAL ASSETS

BACKGROUND

Computing devices are incredibly widespread in today's society. For example, people use desktop and laptop computers, smart phones, personal digital assistants (PDAs), tablet computers, etc., as well as external storage devices such as memory cards or sticks, portable hard drives, etc., to perform a countless number of tasks. Computing devices are associated with digital assets, such as files, electronic messages, documents, images, or the like, which are utilized in connection with computing tasks for which the devices are utilized.

Value, or worth, is a generally recognized property of assets. For instance, people regularly make decisions based on the worth of physical assets they own. As an example, people often limit the amount of cash in their wallet due to the risk of losing the wallet. As the total worth of physical assets in such a scenario can be estimated with relative simplicity, decisions such as these are made with minimal complication.

Similarly, value of digital assets may be desirable to take under consideration in making decisions. However, unlike physical assets, it is conventionally difficult to evaluate the total worth of the digital assets associated with a device. As an immense number of digital assets can be stored on a single device, such as a smart phone, PDA, laptop computer, portable storage device, etc., the difficulty in estimating value of digital assets may result in large collections of assets being unwittingly exposed to loss or theft.

SUMMARY

A system for protecting digital assets associated with a device includes a worth assessment module configured to assign asset worth values to digital assets associated with the device; a value analysis module communicatively coupled to the worth assessment module and configured to determine at least one device worth value according to the asset worth values assigned to the digital assets associated with the device; and an asset protection module communicatively coupled to the worth assessment module and the value analysis module and configured to identify at least one worth value threshold, to perform a comparison between the at least one device worth value and the at least one worth value threshold, and to initiate at least one action with respect to the digital assets associated with the device based on the comparison.

Implementations of the system can include one or more of the following features. The worth assessment module is further configured to assign the asset worth values according to at least one of sentimental value, confidential value or business value. The worth assessment module is further configured to perform at least one of assigning a first asset worth value to the digital assets associated with the device according to sentimental value, assigning a second asset worth value to the digital assets associated with the device according to confidential value, and assigning a third asset worth value to the digital assets associated with the device according to business value. The value analysis module is further configured to determine the at least one device worth value according to at least one of sentimental value, confidential value or business value. The worth assessment module is further configured to assign the asset worth values based on an attribute of the digital assets associated with the device or metadata associated with the digital assets associated with the device. The attribute or metadata include at least one of asset type, asset size, asset location, asset contents, asset author or presence of remote copies. At least one digital asset associated with the device includes an electronic message and the worth assessment module is further configured to assign an asset worth value to the electronic message based on an attribute of the electronic message, metadata associated with the electronic message or an attachment to the electronic message. The attribute or metadata include at least one of a recipient of the electronic message, a sender of the electronic message or a subject of the electronic message.

Implementations of the system can additionally or alternatively include one or more of the following features. The value analysis module is further configured to determine the at least one device worth value as a norm of selected asset worth values assigned to the digital assets associated with the device. The selected asset worth values correspond to at least one of present assets associated with the device, past assets previously associated with the device or anticipated future assets as determined based on one or more requests. The norm comprises a sum of the selected asset worth values. The norm comprises a weighted sum of at least some of the selected asset worth values, a sum of squares of the selected asset worth values, a Euclidian norm of the selected asset worth values or a maximum of the selected asset worth values. The selected asset worth values comprise asset worth values assigned to accessed digital assets on the device. The asset protection module is further configured to restrict access to the digital assets associated with the device if at least one device worth value is greater than a threshold of the at least one worth value threshold. The asset protection module is further configured to modify the at least one worth value threshold upon satisfaction of an authorization procedure. The authorization procedure includes at least one of network re-authorization, external approval, or reentry of credentials. The asset protection module is further configured to provide a notification of asset worth values of respective digital assets associated with the device to at least one of a user of the device, a system administrator or an automated network monitoring entity. The asset protection module is further configured to provide a notification of a device worth value if the device worth value is larger than a corresponding threshold of the at least one worth value threshold.

Further implementations of the system can include one or more of the following features. The asset protection module is further configured to encrypt digital assets associated with the device having asset worth values higher than a threshold. The worth assessment module is further configured to assign asset worth values to the digital assets associated with the device according to at least one of confidential value or business value. The asset protection module is further configured to initiate encryption of the digital assets in response to a device worth value becoming greater than a threshold of the at least one worth value threshold. The asset protection module is further configured to initiate an external backup for a digital asset associated with the device having an asset worth value higher than a threshold. The worth assessment module is further configured to assign asset worth values to the digital assets associated with the device according to at least one of sentimental value or business value. The asset protection module is further configured to maintain the external backup of the digital asset in response to a device worth value becoming greater than a threshold of the at least one worth value threshold.

Still other implementations of the system can include one or more of the following features. The device includes at least one of a computer, a server device configured to maintain data for a computing network or an external disk storage device.

The device includes at least one of a mobile device or a mobile telephone. The asset protection module is further configured to obtain one or more worth value thresholds from an external source. The at least one action is configured via an external source. The at least one action is triggered by a remote entity. At least a portion of the digital assets are accessed from a remote store external to the device. At least one of the worth assessment module, the value analysis module or the asset protection module are located at a computing device that is disparate from the device with which the digital assets are associated. One or more worth assessment modules configured to assign asset worth values to respective digital assets of a set of digital assets, and one or more first value analysis modules communicatively coupled to the one or more worth assessment modules and configured to receive reports of the asset worth values of the respective digital assets from the one or more worth assessment modules. The one or more first value analysis modules are further configured to compute a total value for the set of digital assets according to the reports of the asset worth values of the respective digital assets, and the system further includes one or more asset protection modules communicatively coupled to the one or more first value analysis modules and configured to receive reports of the total value for the set of digital assets from the one or more first value analysis modules. The one or more asset protection modules are further configured to forward the total value for the set of digital assets to one or more second value analysis modules. The set of digital assets is associated with a first device and the one or more asset protection modules are further configured to forward the total value for the set of digital assets and at least one total value corresponding to at least a second device to the one or more second value analysis modules.

A method as described herein includes assigning at least one asset worth value to respective digital assets associated with a device, computing at least one device worth value using the at least one asset worth value assigned to the digital assets associated with the device, identifying at least one device worth value threshold, performing a comparison of the at least one device worth value to the at least one worth value threshold, and initiating at least one action with respect to the digital assets associated with the device based on the comparison.

Implementations of the method can include one or more of the following features. Determining asset worth values for the respective digital assets associated with the device according to at least one of sentimental value, confidential value or business value. The assigning includes at least one of assigning a first asset worth value to the respective digital assets associated with on the device according to sentimental value, assigning a second asset worth value to the respective digital assets associated with the device according to confidential value, or assigning a third asset worth value to the respective digital assets associated with the device according to business value. Computing the at least one device worth value using file worth values assigned according to at least one of sentimental value, confidential value or business value. Assigning the at least one asset worth value based on an attribute of the respective digital assets associated with the device or metadata associated with the respective digital assets associated with the device. The attribute or metadata include at least one of asset types, asset sizes, asset locations, asset contents, asset author or presence of remote copies. At least one digital assets associated with the device comprises an electronic message and the assigning includes assigning an asset worth value to the electronic message based on at least one of an attribute of the electronic message, metadata associated with the electronic message or an attachment to the electronic message. The attribute or metadata include at least one of a recipient of the electronic message, a sender of the electronic message or a subject of the electronic message. Computing a norm of selected asset worth values assigned to at least a portion of the digital assets associated with the device. Computing the norm using asset worth values assigned to respective selected digital assets associated with the device. The selected digital assets include at least one of present assets associated with the device, past assets previously associated with the device or anticipated future assets as determined based on one or more requests. The norm includes a sum of the selected asset worth values. The norm includes at least one of a weighted sum of at least some of the selected asset worth values, a sum of squares of the selected asset worth values or a maximum of the selected asset worth values.

Further implementations of the method can include one or more of the following features. Providing a notification of at least one device worth value. Providing the notification to at least one of a user of the device, a system administrator, or an automated network monitoring entity. Providing a notification of a device worth value if the device worth value is larger than a corresponding threshold of the at least one worth value threshold. Restricting access to the digital assets associated with the device if at least one device worth value is larger than a threshold of the at least one worth value threshold. Modifying the at least one worth value threshold upon completion of an authorization procedure. The authorization procedure includes at least one of network re-authorization, external approval, or re-entry of credentials. Encrypting a digital asset associated with the device for which an asset worth value is higher than a threshold. Assigning asset worth values to respective digital assets associated with the device according to at least one of confidential value or business value. Initiating encryption of the digital asset in response to a device worth value becoming greater than a threshold of the at least one worth value threshold. Maintaining an external backup copy of one or more digital assets associated with the device having an asset worth value that is higher than a threshold. Assigning asset worth values to respective digital assets associated with the device according to at least one of sentimental value or business value. Maintaining the external backup of the one or more digital assets in response to a device worth value becoming greater than a threshold of the at least one worth value threshold. Obtaining the at least one worth value threshold or a configuration for the at least one action via an external source. Accessing at least a portion of the digital assets from a remote store. The initiating at least one action is triggered by a remote entity. Assigning asset worth values to respective digital assets of a set of digital assets, and obtaining reports of the asset worth values of the respective digital assets. Computing a total value for the set of digital assets according to the reports of the asset worth values of the respective digital assets, and obtaining at least one report of the total value for the set of digital assets. The set of digital assets is associated with a first device and the method further includes communicating the total value for the set of digital assets with at least one total value corresponding to at least a second device.

A computing device described herein includes means for assigning asset worth values to respective digital assets associated with a device, means for computing at least one device worth value based on the asset worth values, means for comparing the at least one device worth value to at least one threshold, and means for initiating at least one action with respect to the digital assets associated with the device based on a result of the means for comparing.

Implementations of the computing device can include one or more of the following features. Means for assigning the asset worth values based on one or more value classifications. Means for computing the at least one device worth value based on one or more value classifications. Means for assigning the asset worth values based on an attribute of the respective digital assets or metadata associated with the respective digital assets. Means for computing the at least one device worth value as a norm of asset worth values assigned to at least a portion of the digital assets. Means for generating a notification of the at least one device worth value, means for restricting access to at least a portion of the digital assets associated with the device, means for encrypting at least a portion of the digital assets associated with the device, and/or means for maintaining backup copies of at least a portion of the digital assets associated with the device. Means for obtaining the at least one threshold or a configuration for the at least one action via an external source. Means for accessing at least a portion of the digital assets from a remote store. The means for initiating at least one action is triggered by a remote entity.

A computer program product described herein resides on a processor-readable medium and comprising processor-executable instructions configured to cause a processor to assign asset worth values to respective digital assets associated with a device, compute at least one device worth value based on the asset worth values, compare the at least one device worth value to at least one threshold, and initiate at least one action with respect to the digital assets associated with the device based on a comparison result of the at least one device worth value and the at least one threshold.

Implementations of the computer program product can include one or more of the following features. The instructions configured to cause the processor to assign are further configured to cause the processor to assign the asset worth values based on one or more value classifications. The instructions configured to cause the processor to compute are further configured to cause the processor to compute the at least one device worth value based on one or more value classifications. The instructions configured to cause the processor to assign are further configured to cause the processor to assign the asset worth values based on an attribute of the respective digital assets or metadata associated with the respective digital assets. The instructions configured to cause the processor to compute are further configured to cause the processor to compute the at least one device worth value as a norm of asset worth values assigned to at least a portion of the digital assets. The instructions configured to cause the processor to initiate are further configured to cause the processor to initiate at least one of generating a notification of the at least one device worth value, restricting access to at least a portion of the digital assets associated with the device, encrypting at least a portion of the digital assets associated with the device, or maintaining backup copies of at least a portion of the digital assets associated with the device. Processor-executable instructions configured to cause the processor to obtain the at least one threshold or a configuration for the at least one action via an external source. At least a portion of the digital assets are stored at a remote store. Initiation of the at least one action is triggered by a remote entity.

DETAILED DESCRIPTION

Figure 1:
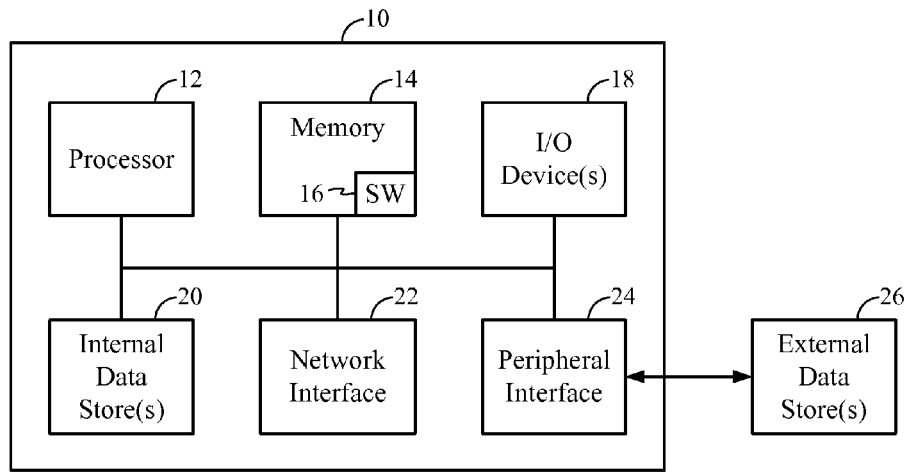
FIG. 1 is a block diagram of components of an example computing device.

Items and/or techniques described herein may provide one or more of the following capabilities, as well as other capabilities not mentioned. The total value of all digital assets or files stored on a device can be computed and applied to various uses. Digital assets can be classified according to multiple value types, such as sentimental value, business value, confidential value, etc. Asset protection measures can be applied automatically for a given device based on value classifications associated with digital assets associated with the device. Asset protection measures can be applied in a targeted manner for some or all assets associated with a device according to a classification of values and/or value types of such assets. While at least one item/technique-effect pair has been described, it may be possible for a noted effect to be achieved by means other than that noted, and a noted item/technique may not necessarily yield the noted effect.

Techniques are described herein for valuating and protecting digital assets associated within a computing device. "Digital assets" refers to collections of data associated with a computing device, such as electronic documents or messages, photographs or other images, spreadsheets and/or other electronic files; databases or database records; operating systems; disk images or system backup information; and/or any other collection(s) of data. "Computing device" includes devices that independently provide computing functionality, such as laptop or desktop computers, tablet computers, smart phones, PDAs, etc., as well as computer storage devices such as internal or external hard drives, memory sticks or memory cards, optical media (e.g., CD, DVD, Blu-Ray disc, etc.), and the like.

The techniques described herein enable a computing device, a user of a computing device, a manager of a computing device, etc., to make decisions regarding digital assets stored on or associated with the computing device based on value of the respective assets. The techniques herein provide mechanisms by which digital assets can be valuated and managed in a similar manner to physical assets. For example, people regularly make decisions based on the worth of physical assets they own. Similarly, digital assets have worth that may be desirably considered in making decisions. Additionally, a digital asset can have various types of worth, such as sentimental value, confidential value, business value, etc. Today's computing devices are capable of storing a significant amount of digital assets. Unlike physical assets, however, difficulty is experienced in evaluating the total worth of assets on a device, which can lead to large collections of assets being unintentionally or unknowingly exposed to loss or theft.

The techniques described herein facilitate management of the risk to digital assets on a device based on their value to an owner of the device. Individual worth of files and/or other digital assets is evaluated, based on which a total worth of digital assets on the device is computed, e.g., as a norm of the individual worth of the respective digital assets. The total worth can be leveraged to enable users to make informed decisions regarding how best to protect the device. Alternatively, the device can be configured to automatically take actions to mitigate risks to the digital assets and/or other appropriate management actions based on the total worth.

Referring to FIG. 1, an example computer system 10 includes a processor 12, memory 14 including software 16, input/output (I/O) device(s) 18 (e.g., a display, speaker, keypad, touch screen or touchpad, etc.) and internal data store(s) 20 (e.g., hard drives or other internal storage devices). The computer system 10 also includes a network interface 22 that enables communication by the computer system 10 with one or more wired or wireless communication networks and a peripheral interface 24 that enables the computer system 10 to utilize peripheral devices, such as peripheral I/O devices or external data store(s) 26. Additionally or alternatively, external data store(s) 26 may be associated with the computer system 10 via a network connection managed through the network interface 22. External data store(s) 26 can also include remote storage device and/or other remote stores from which files or other digital assets can be accessed. Here, the processor 12 is an intelligent hardware device, e.g., a central processing unit (CPU) such as those made by Intel® Corporation or AMD®, a microcontroller, an application specific integrated circuit (ASIC), etc. The memory 32, internal data store(s) 20 and external data store(s) 26 include non-transitory storage media such as random access memory (RAM), read-only memory (ROM), flash memory, or the like. The memory 14 stores the software 16 which is computer-readable, computer-executable software code containing instructions that are configured to, when executed, cause the processor 12 to perform various functions described herein. Alternatively, the software 16 may not be directly executable by the processor 12 but is configured to cause the computer, e.g., when compiled and executed, to perform the functions.

Figure 2:
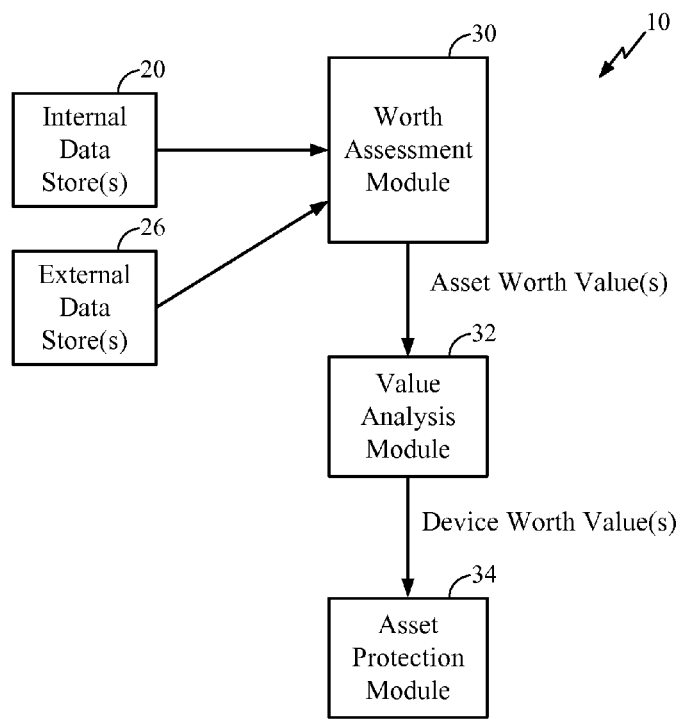
FIG. 2 is a block diagram of a system for valuating and protecting digital assets.

Various mechanisms can be employed to determine the worth or value of digital assets associated with a computing device. The term "computing device" refers to a computer system 10, data stores associated with or independent of a computer system 10, such as internal data stores 20 and/or external data stores 26, or a combination of computer systems and/or data stores. Referring to FIG. 2, a system for protecting digital assets stored on or associated with a computing device includes a worth assessment module 30, a value analysis module 32 and an asset protection module 34. Modules 30-34 can be implemented in hardware, software (e.g., as software 16 stored on a memory 14 and executed by a processor 12 or otherwise configured to cause processor 12 to take specified actions) or a combination of hardware and/or software. Further, modules 30-34 may be associated with a device at which digital assets to be managed are stored, or alternatively, at least one of the modules 30-34 may be located at a remote device and communicatively coupled to the device associated with the digital assets.

Worth assessment module 30 is configured to assign asset worth values to digital assets associated with a computing device comprising internal data stores 20 and/or external data stores 26, which may be associated with or independent from a computer system 10 as shown in FIG. 1. Based on the asset worth values assigned to the digital assets by the worth assessment module 30, value analysis module 32 determines at least one device worth value for the computing system(s) associated with the internal data stores 20 and/or external data stores 26. Asset protection module 34 utilizes the device worth value(s) to selectively initiate at least one action with respect to the digital assets. Here, asset protection module 34 identifies one or more worth value thresholds, compares the device worth value obtained by the value analysis module 32 to the threshold(s), and initiates action(s) with respect to the digital assets based on said comparison, e.g., by initiating action if the device worth value exceeds one or more of the thresholds and abstaining from action otherwise, or vice versa. Other techniques for selectively initiating actions relating to digital assets by the asset protection module 34 are possible. For instance, multiple thresholds can be used and one of a set of multiple actions can be initiated based on the threshold(s) that are exceeded. For a backup procedure, such a scheme could be implemented by creating no backup copies of an asset if no thresholds are exceeded, creating a backup copy at one location if a first threshold is exceeded, creating backup copies at two locations if a second threshold is exceeded, and so on.

While one worth assessment module 30, value analysis module 32, and asset protection module 34 are illustrated in FIG. 2, multiple of such module(s) 30-34 may also be used. For example, one or more worth assessment modules 30 can assign worth values to respective digital assets of a set of digital assets. These worth assessment module(s) 30 can then report the worth values to one or more value analysis modules 32. The one or more value analysis modules 32 can then each compute a total value, as described herein, based on the worth values reported to them. Upon computation, each value analysis module 32 can report its computed total value to one or more asset protection modules 34. The one or more asset protection modules 34 can subsequently initiate one or more actions as described herein. For example, the asset protection module(s) 34 can obtain reports of total values from a first set of value analysis module(s) 32 and forward or otherwise communicate such total values to another, second set of value analysis module(s) 32.

By forwarding computed worth values from asset protection module(s) 34 to value analysis module(s) 32, chains of reporting computed values can be established. For instance, a hierarchy of value analysis modules 32 can be set up in a given system that evaluates the value of digital assets in a subset, subnetwork, subsystem, etc., of devices within the system. Within this configuration, the asset protection module(s) 34 can then act to protect a subset, subnetwork, subsystem, etc., of devices rather than only a single device.

Figure 3:
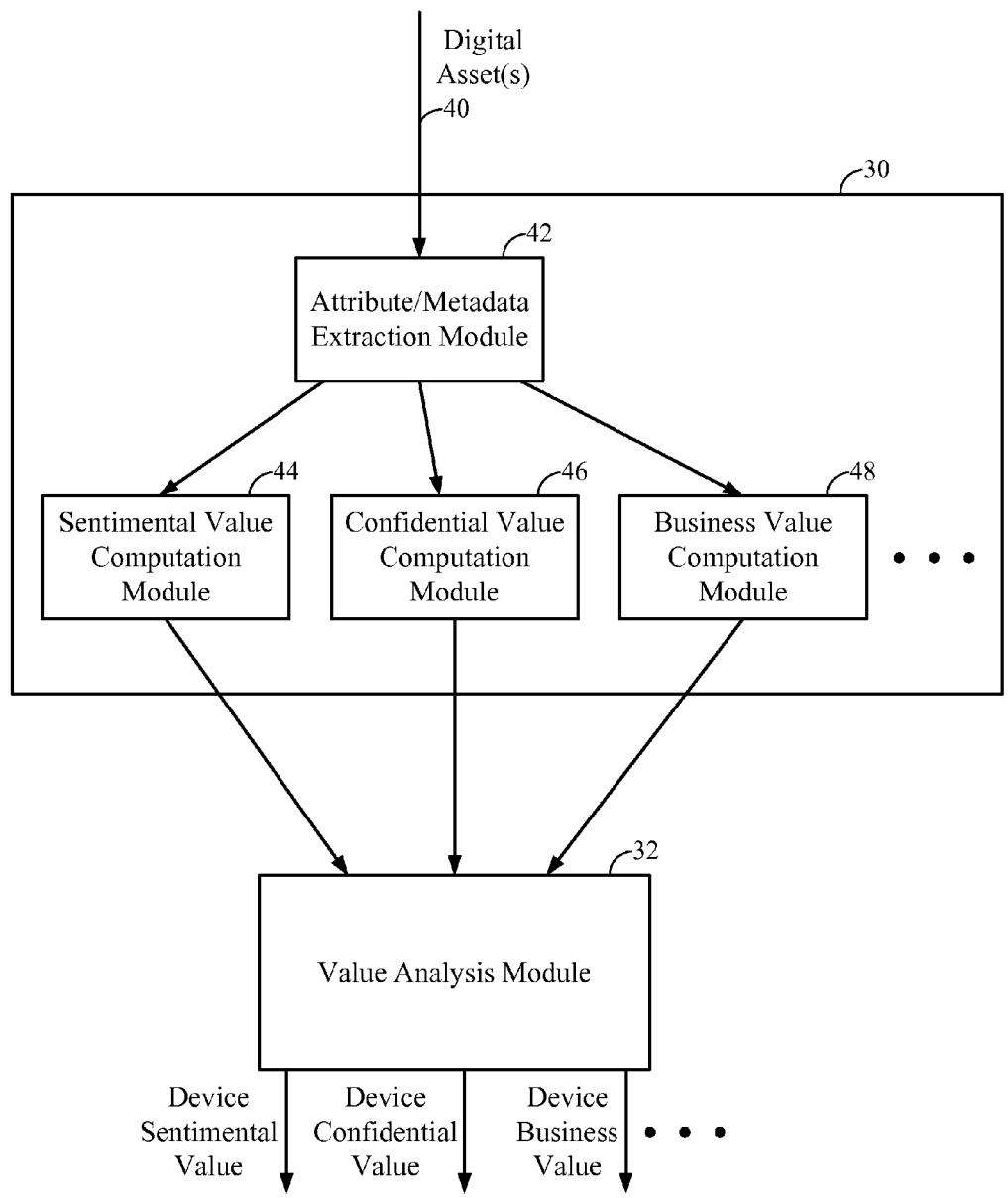
FIG. 3 is a partial functional block diagram of the computing device shown in FIG. 1.

Worth values are assigned to various digital assets 40 according to various criteria and/or metadata associated with the digital assets 40, as shown by FIG. 3. The worth assessment module 30 in FIG. 3 includes an attribute/metadata extraction module 42 that extracts properties and/or metadata from digital assets 40 in order to enable the worth assessment module 30 to assign asset worth values to the digital assets 40 based on the extracted attributes and/or metadata. Attributes and/or metadata which may be extracted by the worth assessment module 30 include asset types, asset sizes, asset locations, asset contents, asset author, presence of remote copies, etc. Further, in the case of an electronic message (email, instant messaging, real-time chat, messages associated with a social networking platform, etc.), attributes and/or metadata may further include attachments to the electronic message, recipients of the electronic message, a sender of the electronic message, a subject of the electronic message, etc. Other asset types and asset-specific attributes or metadata are also possible.

Based on extracted attributes or metadata, the worth assessment module 30 assigns asset worth values to the corresponding digital assets 40. Asset worth values can be assigned according to a "points" system in which more valuable files or other assets are assigned higher point values based on the potential loss if a given asset is compromised. Various examples of point assignment based on asset metadata or attributes follow, although other examples are possible. Asset worth can be assigned based on file type, in which case high worth files can include, e.g., files from accounting or bookkeeping suites, photos, spreadsheets, word processing documents, etc. Asset worth can be assigned for various asset types based on file size; for instance, a 2 KB image is likely to be a thumbnail while a 10 MB image is likely to be a full photo or other image. Photos can additionally be valued based on people and/or other subjects within a photo, metadata associated with the photo, other attributes of the photo, etc. File location can also be considered by the worth assessment module 30; for example, items within temporary folders and browser histories may be regarded as less valuable than items within user folders or other folders.

In the case of an electronic message, such as an email message, valuation can be performed according to distribution (e.g., the number and/or rank of persons to which the message is distributed). If recipients of a message are restricted to high-ranking employees within an organization, then high value may be assumed. If the recipients are low-ranking employees, or the email is sent throughout the whole organization, the message may instead be assumed to be of lower value.

For some factors, the impact on asset worth may depend on the definition(s) of asset worth as utilized by the worth assessment module 30. For instance, if a user is primarily concerned with avoiding loss of an asset (as opposed to unauthorized access), the presence of a remote copy of the asset would lower the value of both the original and the duplicate, as a copy of the asset would persist even if one of the copies was lost. Conversely, if the primary concern is unauthorized access, any copy of an asset can be assigned the value of the original.

As noted above, the worth assessment module 30 may also assign worth values to digital assets 40 based on multiple types or classifications of value. Here, the worth assessment module includes a sentimental value computation module 44, a confidential value computation module 46 and a business value computation module 48. Other classifications of value may also be used. The various computation modules 44-48 can compute a single asset worth value as a composite of multiple value classifications, or alternatively separate asset worth values can be computed for each value classification (e.g., a first worth value for sentimental value, a second worth value for confidential value, a third worth value for business value, etc.).

Sentimental value computation module 44 can utilize various factors to estimate the sentimental value of a given digital asset 40 to a user of a corresponding computing device. An estimation of sentimental value can be based on, e.g., friends or relatives of the device user referred to or appearing in a digital asset, events associated with a digital asset (e.g., marriage, graduation, family vacation, etc.), etc. Files of some file types, such as photographs, may also be considered as more likely to hold sentimental value than files of other file types.

Confidential value computation module 46 estimates the importance that a given asset remain confidential, e.g., based on the risk of loss if the asset is lost, stolen or otherwise accessed by an unauthorized party. A determination of confidential value can be based on asset classification; for example, assets such as medical records, tax records and human resource files can be given high confidential value. Confidential value can also be based on the presence of text, headers, watermarks, etc., that mark an asset as privileged, confidential, secret or top secret or otherwise indicate the confidentiality of an asset.

Business value computation module 48 estimates the value of a given asset to a business associated with the computing device. For example, assets relating to intellectual property or upcoming business acquisitions may be given high business value. Files of some file types, such as financial records, human resources files, etc., may be regarded as more likely to have high business value than files of other file types.

The asset worth values corresponding to digital assets 40 associated with a computing device are passed to a value analysis module 32, which computes one or more device worth values corresponding to the computing device. Similar to the worth assessment module 30, the value analysis module 32 may consider various value classifications in computing a device worth value. The value analysis module 32 can compute a single composite device worth value for a given device, or alternatively multiple worth values can be computed corresponding to, e.g., value classifications. In FIG. 3, the value analysis module provides device worth values corresponding to sentimental, confidential and business value (e.g., based on asset worth values for the corresponding classifications given by the worth assessment module 30).

Figure 4:
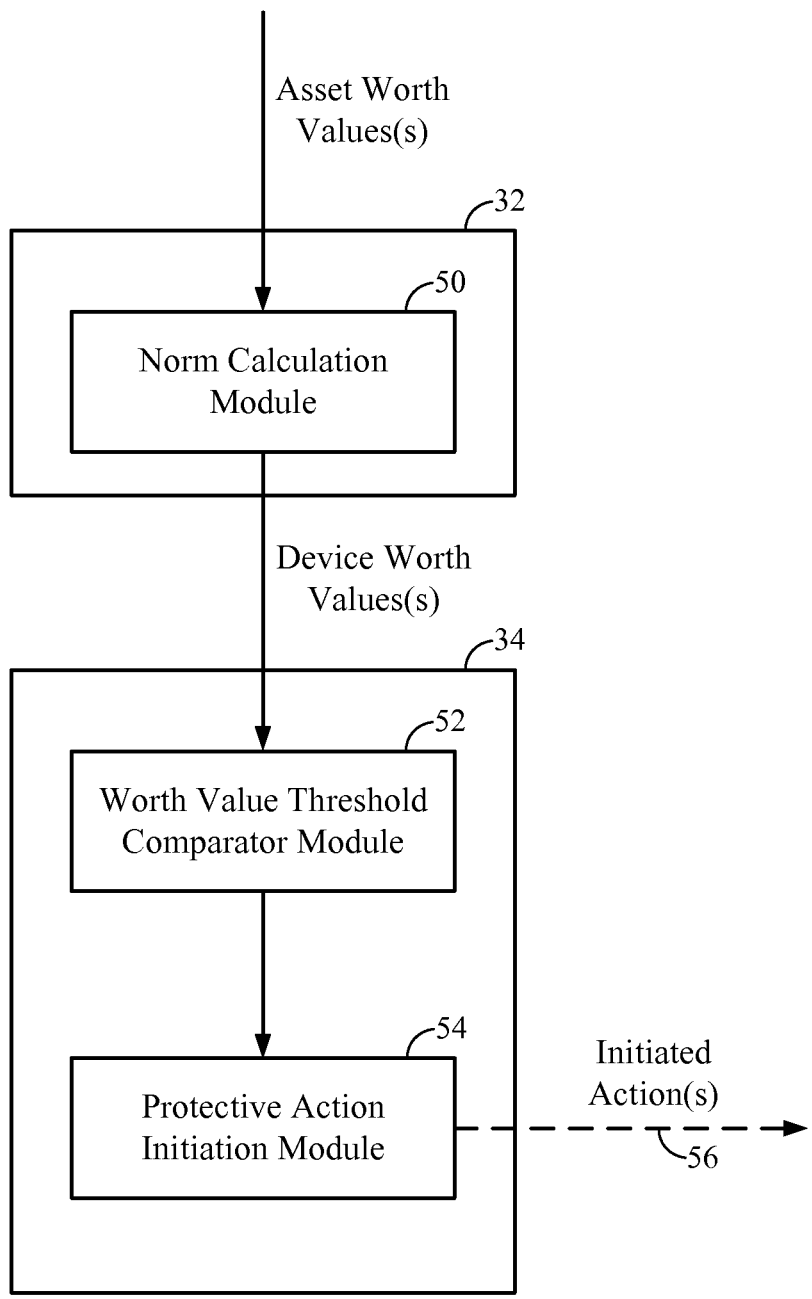
FIG. 4 is another partial functional block diagram of the computing device shown in FIG. 1.

Upon receiving asset worth values from the worth assessment module 30, the value analysis module 32 computes one or more device worth values as a norm of the asset worth values via a norm calculation module 50, as shown in FIG. 4. The value analysis module 32 can compute device worth values based on asset worth values corresponding to at least a portion of the digital assets 40 associated with a computing device. The value analysis module 32 can utilize a selected set of digital assets 40, which can include at least one of present assets associated with a device, past assets previously associated with the device, or anticipated future assets to be associated with the device (e.g., as predicted based on one or more requests for assets or other presently known information).

The norm calculation module 50 can generate a device worth value from selected asset worth values in a variety of manners. Norms that can be utilized as the basis for device worth value calculations include, but are not limited to, a sum of selected asset worth values, a weighted sum of at least some selected asset worth values, a sum of squares of selected asset worth values, a maximum of selected asset worth values, an average of selected asset worth values, a Euclidian norm, etc. In the event that asset worth values correspond to individual value classifications, the value analysis module 32 can compute device worth values for one or more of the classifications and/or compute a composite device worth value by, e.g., summing or obtaining another norm of device worth values for each classification.

Once calculated, device worth values are provided to an asset protection module 34. The asset protection module maintains one or more worth value thresholds and compares device worth values received from the value analysis module 32 to the threshold(s) using a worth value threshold comparator module 52. Based on a result of the comparison(s), the asset protection module 34 selectively initiates one or more actions 56 with respect to the digital assets 40 corresponding to the device worth value. For instance, one or more actions 56 can be initiated in the event that a device worth value exceeds a corresponding threshold. Alternatively, multiple thresholds can be maintained and one or more of a set of multiple actions can be initiated based on the threshold(s) that are exceeded. Further, the asset protection module 34 can also compare individual asset worth values to corresponding thresholds and initiate various appropriate actions 56 for individual assets according to such comparisons.

Actions 56 initiated by the asset protection module 34 facilitate various mitigation strategies employed on a per-device or per-file basis. On a per-device basis, the asset protection module 34 can provide a notification of the total value of data stored on a device (e.g., corresponding to at least one device worth value). Such a notification can be provided to a user of the device, a system administrator, an automated network monitoring entity, etc. The asset protection module 34 can also limit the total value of assets allowed to be stored on a given device and/or restrict or lock access to a device carrying more than a threshold amount of asset value (e.g., as determined by the worth value threshold comparator module 52). Such restriction can be conditional; for example, the device may be locked if it contains higher than a threshold amount of asset value and the device has not connected to a home or authorized network within a set period of time (e.g., indicating that the device is likely to be lost or stolen) or inappropriate access to the device is otherwise evident. In the event that access restrictions as described above are applied, the restrictions can be relaxed or lifted, or the worth value threshold(s) causing the restrictions can be modified, upon completion of an authorization procedure. Authorization procedures used in this manner can include network re-authorization, external approval (e.g., by a system administrator or other organizational management entity), re-entry of credentials (password, fingerprint or other biometric signature, etc.) or the like.

A variety of mitigations can be applied by the asset protection module 34 to allow limited access to assets deemed to be valuable. A restriction can be placed on the amount of asset value accessible in a given time period (per hour, per day, etc.), thereby slowing or stopping attempts to copy or access an entire collection of valuable assets on a device. A user can also be allocated a limited amount of permissible value points, such that the user "spends" the permissible points by accessing (or copying, searching for, etc.) various assets. As the user approaches the value limit, the user's access to assets on the device can be slowed and/or stopped. The user's allocation of points can subsequently be topped up or increased with supervisor approval, by reconnecting to an internal network, contacting organizational technical support, rekeying user credentials (e.g., SecurID or a similar mechanism), etc. As a user is allocated points that need to be topped up periodically, the user is made further aware of the value of the resources being accessed.

On a per-asset basis, digital assets 40 having a sufficiently high asset worth value, either overall or in one or more classifications (e.g., confidential value or business value, etc.), can be encrypted. The value of respective digital assets 40 can also be monitored over time such that encryption is initiated for various assets as worth value(s) for the asset or the device on which the asset is stored increase beyond a threshold. In the event that a file or other asset encrypted in this manner is decrypted (e.g., upon being opened for viewing), the value of the asset is increased and the asset protection module 34 may adjust its initiated actions 56 to reflect the new value of the asset.

The asset protection module 34 can also maintain external backup copies of respective digital assets 40 having asset worth values (e.g., overall or corresponding to one or more classifications, such as sentimental value or business value) that are higher than a given threshold. The value of respective digital assets 40 can also be monitored over time such that external backup is initiated for various assets as worth value(s) for the asset or the device on which the asset is stored increase beyond a threshold. The backup schedule for digital assets 40 can be dictated by asset value such that, e.g., more valuable assets are backed up before other assets and/or backed up more frequently than other assets. Assets deemed sufficiently valuable can also be automatically updated to new formats, in which case the older formats of the assets may be placed in backup storage. Further, confidential files or other assets (e.g., assets with a high worth value corresponding to confidential value, etc.) that have not been used for a threshold amount of time may be backed up at a remote backup store. Upon backing up a confidential asset, the local copy may be deleted.

Additionally, the asset protection module 34 can put various mitigations in place to ensure that an attempted attacker or unauthorized user of a computing device is required to do more than merely guess a password to access confidential assets. For example, encryption keys for respective assets can be stored off-device in a key store, which may be available on a network associated with the computing device, on an external storage device such as a Universal Serial Bus (USB) or Bluetooth device, etc. Two-factor authentication can also be used based on, e.g., a SecurID token in addition to a password and/or any other authentication mechanism(s). Access to confidential resources can further be protected against various websites and untrusted applications by limiting access (e.g., read, write, delete, or execute access) of the websites and/or applications to valuable assets without a password or other authentication. Assets deemed sufficiently valuable may also be stored off-device, e.g., remotely or in portable storage, with similar mitigations as those described above protecting the off-device storage.

As described above, the asset protection module 34 can implement various risk mitigation strategies based on the value of assets and the classification of such value. For example, a first mitigation strategy can be used for an asset having a high worth value in a first classification (e.g., backup of an asset with high sentimental value), while a second mitigation strategy can be used for an asset having a high worth value in a second classification (e.g., encryption of an asset with high confidential value). In the event that an asset has high value in multiple classifications, mitigation strategies for the multiple classifications may conflict. For instance, a document having both high confidential value and high business value may be encrypted due to the confidential value and backed up due to the high business value; however, backup of the document may be undesirable due to the confidential nature of the document. In such a scenario, conflicts between mitigation strategies can be resolved based on conflict resolution rules, user preferences, and/or other mechanisms.

Operation of the worth assessment module 30, value analysis module 32 and asset protection module 34 as described herein can be implemented within a single device (e.g., via a processor 12 executing software 16 stored on a memory 14) or a combination of devices. For example, asset protection module 34 can be implemented or controlled by a remote entity or any other suitable entity. For example, the asset protection module 34 can communication with an external source or entity, which can configure, trigger, or otherwise control action(s) initiated by the asset protection module 34.

Figure 5:
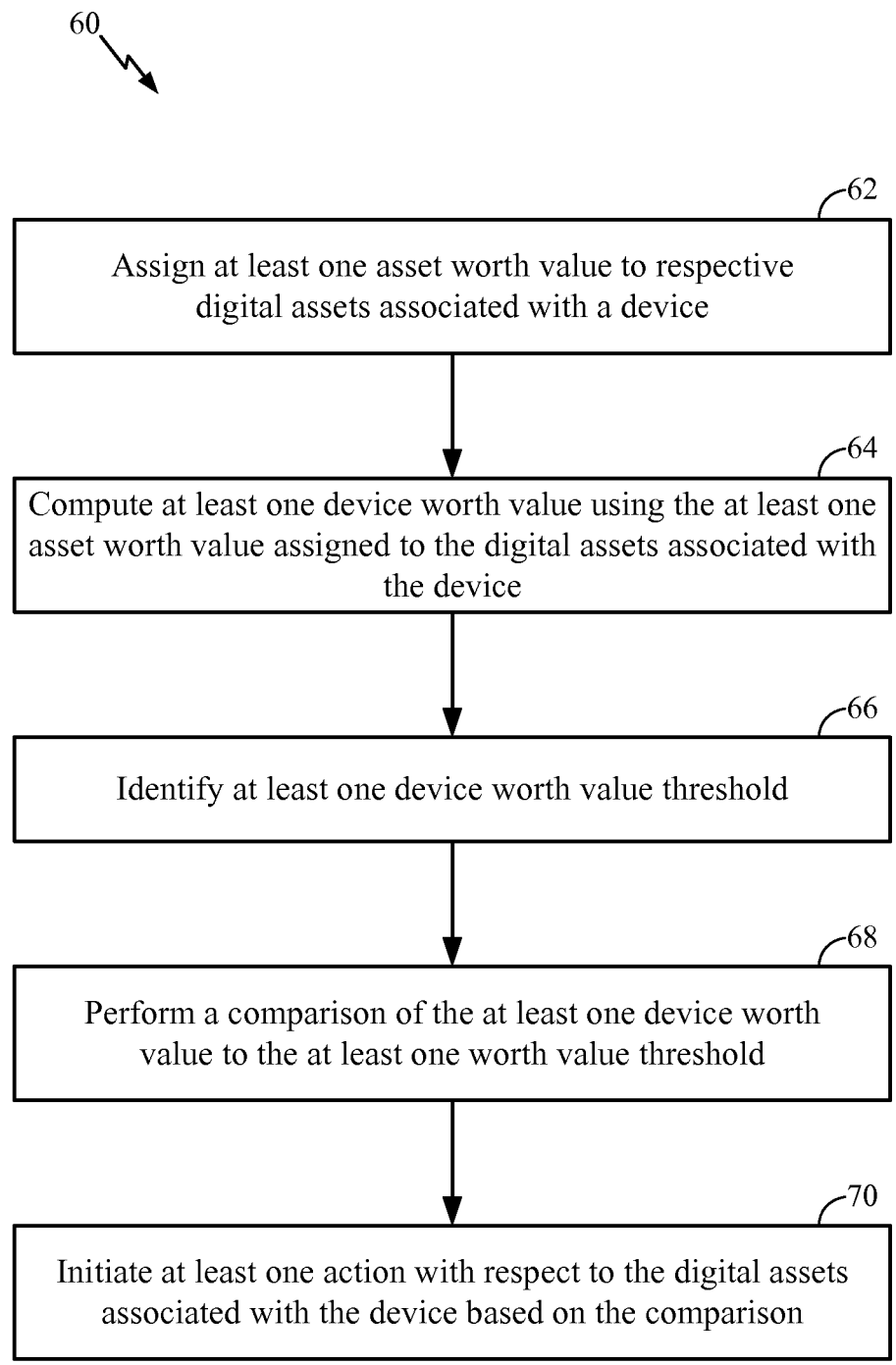
FIG. 5 is a block flow diagram of a process of managing digital assets associated with a computing device.

Referring to FIG. 5, with further reference to FIGS. 1-4, a process 60 of managing digital assets 40 associated with a computing device includes the stages shown. The process 60 is, however, an example only and not limiting. The process 60 can be altered, e.g., by having stages added, removed, rearranged, combined, and/or performed concurrently. Still other alterations to the process 60 as shown and described are possible.

At stage 62, at least one asset worth value is assigned to respective digital assets 40 associated with a device (e.g., a computer system 10, an internal data store 20, an external data store 26, etc.). Asset worth values can be assigned by a worth assessment module 30, which may be implemented via a processor 12 executing software 16 stored on a memory 14 or by other means, for overall asset value or for various classifications of asset value (e.g., business value, confidential value, sentimental value, etc.). At stage 64, at least one device worth value is computed using the at least one asset worth value assigned at stage 62 to the digital assets 40 associated with the device. The device worth value can be computed by, e.g., a value analysis module 32, which may be implemented by a processor executing software 16 stored on a memory 14 or by other means. The device worth value may be calculated as a norm of asset worth values and/or in any other suitable manner. Similar to the asset worth values, device worth values may be calculated at stage 64 for overall device value or device value according to various classifications.

At stage 66, at least one device worth threshold value is identified. Next, at stage 68, a comparison is performed between the at least one device worth value computed at stage 64 and the at least one worth value threshold identified at stage 66. The comparison at stage 68 may be performed using an asset protection module 34, a worth value threshold comparator module 52, or other suitable mechanisms, which may be implemented via a processor 12 executing software 16 stored on a memory 14 or by other means.

Based on the comparison at stage 68, at least one action 56 is initiated with respect to the digital assets 40 associated with the device at stage 70. The action(s) 56 may be initiated by, e.g., an asset protection module 34, a protective action initiation module 54, or other suitable mechanisms, which may be implemented via a processor 12 executing software 16 stored on a memory 14 or by other means. Actions 56 initiated at stage 70 can include, but are not limited to, encryption of assets, external backup, imposition of access restrictions to the device or one or more assets stored thereon, etc.

One or more of the components, steps, features and/or functions illustrated in FIGS. 1, 2, 3, 4, and/or 5 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, and/or 4 may be configured to perform one or more of the methods, features, or steps described in FIG. 5. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A system implemented on a processor-based machine for protecting digital assets associated with a device, the system comprising:

a worth assessment module, implemented on the processor-based machine, configured to assign asset worth values to digital assets associated with the device;

a value analysis module, implemented on the processor-based machine, communicatively coupled to the worth assessment module and configured to determine at least one device worth value according to the asset worth values assigned to the digital assets associated with the device; and an asset protection module, implemented on the processor-based machine, communicatively coupled to the worth assessment module and the value analysis module and configured to identify at least one worth value threshold, to perform a comparison between the at least one device worth value and the at least one worth value threshold, and to initiate at least one action to mitigate risk of loss of the digital assets associated with the device based on the comparison between the at least one device worth value, determined according to the asset worth values assigned to the digital assets, and the at least one worth value threshold.

2. The system of claim 1 wherein the worth assessment module is further configured to assign the asset worth values according to at least one of sentimental value, confidential value or business value.

3. The system of claim 1 wherein the worth assessment module is further configured to perform at least one of assigning a first asset worth value to the digital assets associated with the device according to sentimental value, assigning a second asset worth value to the digital assets associated with the device according to confidential value, and assigning a third asset worth value to the digital assets associated with the device according to business value.

4. The system of claim 1 wherein the value analysis module is further configured to determine the at least one device worth value according to at least one of sentimental value, confidential value or business value.

5. The system of claim 1 wherein the worth assessment module is further configured to assign the asset worth values based on an attribute of the digital assets associated with the device or metadata associated with the digital assets associated with the device.

6. The system of claim 5 wherein the attribute or metadata comprises at least one of asset type, asset size, asset location, asset contents, asset author or presence of remote copies.

7. The system of claim 1 wherein at least one digital asset associated with the device comprises an electronic message and the worth assessment module is further configured to assign an asset worth value to the electronic message based on an attribute of the electronic message, metadata associated with the electronic message or an attachment to the electronic message.

8. The system of claim 7 wherein the attribute or metadata comprises at least one of a recipient of the electronic message, a sender of the electronic message or a subject of the electronic message.

9. The system of claim 1 wherein the value analysis module is further configured to determine the at least one device worth value as a norm of selected asset worth values assigned to the digital assets associated with the device.

10. The system of claim 9 wherein the selected asset worth values correspond to at least one of present assets associated with the device, past assets previously associated with the device or anticipated future assets as determined based on one or more requests.

11. The system of claim 9 wherein the norm comprises a sum of the selected asset worth values.

12. The system of claim 9 wherein the norm comprises a weighted sum of at least some of the selected asset worth values, a sum of squares of the selected asset worth values, a Euclidian norm of the selected asset worth values or a maximum of the selected asset worth values.

13. The system of claim 9 wherein the selected asset worth values comprise asset worth values assigned to accessed digital assets on the device.

14. The system of claim 1 wherein the asset protection module is further configured to restrict access to the digital assets associated with the device if at least one device worth value is greater than a threshold of the at least one worth value threshold.

15. The system of claim 14 wherein the asset protection module is further configured to modify the at least one worth value threshold upon satisfaction of an authorization procedure.

16. The system of claim 15 wherein the authorization procedure comprises at least one of network re-authorization, external approval, or reentry of credentials.

17. The system of claim 1 wherein the asset protection module is further configured to provide a notification of asset worth values of respective digital assets associated with the device to at least one of a user of the device, a system administrator or an automated network monitoring entity.

18. The system of claim 1 wherein the asset protection module is further configured to provide a notification of a device worth value if the device worth value is larger than a corresponding threshold of the at least one worth value threshold.

19. The system of claim 1 wherein the asset protection module is further configured to encrypt digital assets associated with the device having asset worth values higher than a threshold.

20. The system of claim 19 wherein the worth assessment module is further configured to assign asset worth values to the digital assets associated with the device according to at least one of confidential value or business value.

21. The system of claim 19 wherein the asset protection module is further configured to initiate encryption of the digital assets in response to a device worth value becoming greater than a threshold of the at least one worth value threshold.

22. The system of claim 1 wherein the asset protection module is further configured to initiate an external backup for a digital asset associated with the device having an asset worth value higher than a threshold.

23. The system of claim 22 wherein the worth assessment module is further configured to assign asset worth values to the digital assets associated with the device according to at least one of sentimental value or business value.

24. The system of claim 22 wherein the asset protection module is further configured to maintain the external backup of the digital asset in response to a device worth value becoming greater than a threshold of the at least one worth value threshold.

25. The system of claim 1 wherein the device comprises at least one of a computer, a server device configured to maintain data for a computing network or an external disk storage device.

26. The system of claim 1 wherein the device comprises at least one of a mobile device or a mobile telephone.

27. The system of claim 1 wherein the asset protection module is further configured to obtain one or more worth value thresholds from an external source.

28. The system of claim 1 wherein the at least one action is configured via an external source.

29. The system of claim 1 wherein the at least one action is triggered by a remote entity.

30. The system of claim 1 wherein at least a portion of the digital assets are accessed from a remote store external to the device.

31. The system of claim 1 wherein at least one of the worth assessment module, the value analysis module or the asset protection module are located at a computing device that is disparate from the device with which the digital assets are associated.

32. The system of claim 1 further comprising:
one or more worth assessment modules configured to assign asset worth values to respective digital assets of a set of digital assets; and
one or more first value analysis modules communicatively coupled to the one or more worth assessment modules and configured to receive reports of the asset worth values of the respective digital assets from the one or more worth assessment modules.

33. The system of claim 32 wherein the one or more first value analysis modules are further configured to compute a total value for the set of digital assets according to the reports of the asset worth values of the respective digital assets, and the system further comprises:
one or more asset protection modules communicatively coupled to the one or more first value analysis modules and configured to receive reports of the total value for the set of digital assets from the one or more first value analysis modules.

34. The system of claim 33 wherein the one or more asset protection modules are further configured to forward the total value for the set of digital assets to one or more second value analysis modules.

35. The system of claim 34 wherein the set of digital assets is associated with a first device and the one or more asset protection modules are further configured to forward the total value for the set of digital assets and at least one total value corresponding to at least a second device to the one or more second value analysis modules.

36. A method comprising:
assigning, by a processor-based machine, at least one asset worth value to respective digital assets associated with a device;
computing, by the processor-based machine, at least one device worth value using the at least one asset worth value assigned to the digital assets associated with the device;
identifying, by the processor-based machine, at least one device worth value threshold;
performing, by the processor-based machine, a comparison of the at least one device worth value to the at least one worth value threshold; and
initiating, by the processor-based machine, at least one action to mitigate risk of loss of the digital assets associated with the device based on the comparison between the at least one device worth value, computed using the at least one asset worth value assigned to the respective digital assets, and the at least one worth value threshold.

37. The method of claim 36 wherein the assigning comprises determining asset worth values for the respective digital assets associated with the device according to at least one of sentimental value, confidential value or business value.

38. The method of claim 36 wherein the assigning comprises at least one of:
assigning a first asset worth value to the respective digital assets associated with on the device according to sentimental value;
assigning a second asset worth value to the respective digital assets associated with the device according to confidential value; or
assigning a third asset worth value to the respective digital assets associated with the device according to business value.

39. The method of claim 36 wherein the computing comprises computing the at least one device worth value using file worth values assigned according to at least one of sentimental value, confidential value or business value.

40. The method of claim 36 wherein the assigning comprises assigning the at least one asset worth value based on an attribute of the respective digital assets associated with the device or metadata associated with the respective digital assets associated with the device.

41. The method of claim 40 wherein the attribute or metadata comprises at least one of asset types, asset sizes, asset locations, asset contents, asset author or presence of remote copies.

42. The method of claim 36 wherein at least one digital assets associated with the device comprises an electronic message and the assigning comprises assigning an asset worth value to the electronic message based on at least one of an attribute of the electronic message, metadata associated with the electronic message or an attachment to the electronic message.

43. The method of claim 42 wherein the attribute or metadata comprises at least one of a recipient of the electronic message, a sender of the electronic message or a subject of the electronic message.

44. The method of claim 36 wherein the computing comprises computing a norm of selected asset worth values assigned to at least a portion of the digital assets associated with the device.

45. The method of claim 44 wherein the computing further comprises computing the norm using asset worth values assigned to respective selected digital assets associated with the device.

46. The method of claim 45 wherein the selected digital assets comprise at least one of present assets associated with the device, past assets previously associated with the device or anticipated future assets as determined based on one or more requests.

47. The method of claim 44 wherein the norm comprises a sum of the selected asset worth values.

48. The method of claim 44 wherein the norm comprises at least one of a weighted sum of at least some of the selected asset worth values, a sum of squares of the selected asset worth values or a maximum of the selected asset worth values.

49. The method of claim 36 wherein the initiating comprises providing a notification of at least one device worth value.

50. The method of claim 49 wherein providing the notification comprises providing the notification to at least one of a user of the device, a system administrator, or an automated network monitoring entity.

51. The method of claim 49 wherein providing a notification comprises providing a notification of a device worth value if the device worth value is larger than a corresponding threshold of the at least one worth value threshold.

52. The method of claim 36 wherein the initiating comprises restricting access to the digital assets associated with the device if at least one device worth value is larger than a threshold of the at least one worth value threshold.

53. The method of claim 52 wherein the initiating further comprises modifying the at least one worth value threshold upon completion of an authorization procedure.

54. The method of claim 53 wherein the authorization procedure comprises at least one of network re-authorization, external approval, or re-entry of credentials.

55. The method of claim 36 wherein the initiating comprises encrypting a digital asset associated with the device for which an asset worth value is higher than a threshold.

56. The method of claim 55 wherein the assigning comprises assigning asset worth values to respective digital assets associated with the device according to at least one of confidential value or business value.

57. The method of claim 55 wherein the encrypting comprises initiating encryption of the digital asset in response to a device worth value becoming greater than a threshold of the at least one worth value threshold.

58. The method of claim 36 wherein the initiating comprises maintaining an external backup copy of one or more digital assets associated with the device having an asset worth value that is higher than a threshold.

59. The method of claim 58 wherein the assigning comprises assigning asset worth values to respective digital assets associated with the device according to at least one of sentimental value or business value.

60. The method of claim 58 wherein maintaining the external backup comprises maintaining the external backup of the one or more digital assets in response to a device worth value becoming greater than a threshold of the at least one worth value threshold.

61. The method of claim 36 further comprising obtaining the at least one worth value threshold or a configuration for the at least one action via an external source.

62. The method of claim 36 further comprising accessing at least a portion of the digital assets from a remote store.

63. The method of claim 36 wherein the initiating at least one action is triggered by a remote entity.

64. The method of claim 36 further comprising:
assigning asset worth values to respective digital assets of a set of digital assets; and
obtaining reports of the asset worth values of the respective digital assets.

65. The method of claim 64 further comprising:
computing a total value for the set of digital assets according to the reports of the asset worth values of the respective digital assets; and
obtaining at least one report of the total value for the set of digital assets.

66. The method of claim 65 wherein the set of digital assets is associated with a first device and the method further comprises communicating the total value for the set of digital assets with at least one total value corresponding to at least a second device.

* * * * *